United States Patent
Ladurini et al.

(10) Patent No.: US 11,345,462 B2
(45) Date of Patent: May 31, 2022

(54) SYSTEM CONTROL ARCHITECTURE MONITORING SYSTEM

(71) Applicants: Aaron R. Ladurini, Palm Bay, CA (US); Steven A. Cook, West Melbourne, FL (US); George R. Litteral, Palm Bay, FL (US); Philip J. Wagner, Davenport, FL (US); Brian Robichaux, Rockledge, FL (US); Woodrow Hawthorne, Mims, FL (US); Keith Auger, Melbourne, FL (US); Michael Miskow, Palm Bay, FL (US); Shanel Crusoe, West Melbourne, FL (US); Daniel W. Plawecki, Ocala, FL (US)

(72) Inventors: Aaron R. Ladurini, Palm Bay, CA (US); Steven A. Cook, West Melbourne, FL (US); George R. Litteral, Palm Bay, FL (US); Philip J. Wagner, Davenport, FL (US); Brian Robichaux, Rockledge, FL (US); Woodrow Hawthorne, Mims, FL (US); Keith Auger, Melbourne, FL (US); Michael Miskow, Palm Bay, FL (US); Shanel Crusoe, West Melbourne, FL (US); Daniel W. Plawecki, Ocala, FL (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 413 days.

(21) Appl. No.: 16/460,081

(22) Filed: Jul. 2, 2019

(65) Prior Publication Data

US 2020/0298960 A1 Sep. 24, 2020

Related U.S. Application Data

(60) Provisional application No. 62/822,416, filed on Mar. 22, 2019.

(51) Int. Cl.
*B64C 13/18* (2006.01)
*G05B 13/02* (2006.01)
*G07C 5/08* (2006.01)

(52) U.S. Cl.
CPC ............ *B64C 13/18* (2013.01); *G05B 13/021* (2013.01); *G07C 5/0808* (2013.01)

(58) Field of Classification Search
CPC ...... B64C 13/18; G05B 13/021; G07C 5/0808
(Continued)

(56) References Cited

U.S. PATENT DOCUMENTS 6,788,980 B1* 9/2004 Johnson .................... G06F 8/60
   700/1
8,090,452 B2* 1/2012 Johnson ............. G05B 19/4184
   700/17

(Continued)

FOREIGN PATENT DOCUMENTS

EP    2063399 A2 * 5/2009  .......... G07C 5/0808
EP    3217364 A2    9/2017
(Continued)

OTHER PUBLICATIONS

David et al., "Mission-level Space Situational Awareness," 2015, Publisher: IEEE.*

(Continued)

*Primary Examiner* — Tuan C To
(74) *Attorney, Agent, or Firm* — Tarolli, Sundheim, Covell & Tummino LLP

(57) ABSTRACT

One example includes a system control architecture that includes local control systems to provide respective condi- (Continued)

tion signals associated with situational awareness conditions of an associated system architecture. A central system controller receives the condition signals, generates a control scheme for control of operational aspects of the associated system architecture based on the condition signals, and generates control signals based on the control scheme. The control scheme defines contributions of each of the local control systems to a control authority of each of the operational aspects. Operational components provide mechanical control of each of the operational aspects of the associated system architecture in response to the respective control signals to implement the control scheme. A control authority interface system provides an indication to a user of the respective contributions of the control authority of each of the respective local control systems to the operational aspects of the associated system architecture.

20 Claims, 4 Drawing Sheets

(58) Field of Classification Search
USPC .................................................. 701/3
See application file for complete search history.

(56) References Cited

U.S. PATENT DOCUMENTS

| | | | | |
|---|---|---|---|---|
| 8,346,429 B2* | 1/2013 | Nwadiogbu | ............ | G07C 5/085 |
| | | | | 701/31.4 |
| 8,346,700 B2* | 1/2013 | Nwadiogbu | ....... | G05B 23/0213 |
| | | | | 706/46 |
| 8,560,160 B2* | 10/2013 | Holzer | ............... | G05B 19/4184 |
| | | | | 701/29.4 |
| 9,916,702 B2* | 3/2018 | Rudenko | ............. | G07C 5/0808 |
| 10,019,005 B2* | 7/2018 | Wang | ...................... | G06N 7/005 |
| 10,124,893 B1* | 11/2018 | Aalund | .................. | B64C 39/024 |
| 10,192,453 B2* | 1/2019 | Khatwa | ................ | G08G 5/0065 |
| 10,302,450 B1* | 5/2019 | Doty | ...................... | G01C 23/00 |
| 10,380,277 B2* | 8/2019 | Beale | ................ | G05B 23/0283 |
| 10,423,158 B1* | 9/2019 | Hadlich | ............... | G07C 5/0816 |
| 10,594,555 B2* | 3/2020 | McNab | ............. | G05B 19/0423 |
| 10,620,592 B2* | 4/2020 | Sangi | ....................... | H04L 67/42 |
| 10,661,914 B2* | 5/2020 | Ziarno | ...................... | B64F 5/60 |
| 11,049,333 B2* | 6/2021 | Tucker | ...................... | B64F 5/60 |
| 2002/0198971 A1* | 12/2002 | Resnick | ............. | G05B 19/0421 |
| | | | | 709/221 |
| 2006/0235707 A1* | 10/2006 | Goldstein | ............... | F42B 15/00 |
| | | | | 702/182 |
| 2009/0125163 A1* | 5/2009 | Duggan | .................. | B64C 19/00 |
| | | | | 701/2 |
| 2009/0138423 A1* | 5/2009 | Nwadiogbu | ....... | G05B 23/0213 |
| | | | | 706/46 |
| 2010/0235037 A1* | 9/2010 | Vian | .................... | G07C 5/0808 |
| | | | | 701/31.4 |
| 2012/0029897 A1* | 2/2012 | Cherian | .................. | H02J 13/00 |
| | | | | 703/18 |
| 2012/0283963 A1* | 11/2012 | Mitchell | ............... | F01D 21/003 |
| | | | | 702/34 |
| 2013/0176687 A1* | 7/2013 | Epperson | ............. | H05K 7/1478 |
| | | | | 361/735 |
| 2013/0298139 A1* | 11/2013 | Resnick | ............. | G05B 19/0421 |
| | | | | 719/316 |
| 2015/0212581 A1* | 7/2015 | Kawalkar | ............... | B64C 19/00 |
| | | | | 701/3 |
| 2015/0293503 A1* | 10/2015 | Wall | .................... | G05B 23/0262 |
| | | | | 700/28 |
| 2016/0236790 A1* | 8/2016 | Knapp | ................. | G08G 5/0021 |
| 2016/0299497 A1* | 10/2016 | McLaughlin | ...... | G05B 19/4185 |
| 2016/0342920 A1* | 11/2016 | Tucker | ................... | G06Q 10/20 |
| 2017/0353353 A1* | 12/2017 | Nicholas | ............. | H04L 41/0803 |
| 2018/0088548 A1* | 3/2018 | Sangi | ....................... | H04W 4/70 |
| 2018/0155061 A1* | 6/2018 | Bewlay | .................. | B64D 27/10 |
| 2018/0257664 A1* | 9/2018 | Remboski | ............ | G07C 5/0808 |
| 2018/0268624 A1* | 9/2018 | Remboski | ............. | H04L 67/125 |
| 2018/0321662 A1* | 11/2018 | Nixon | .................... | G06F 13/364 |
| 2018/0354647 A1* | 12/2018 | North | ........................ | B64F 5/60 |
| 2018/0364707 A1* | 12/2018 | Bosworth | ............ | G05D 1/0676 |
| 2019/0031330 A1* | 1/2019 | Groden | .................. | B64C 13/16 |
| 2019/0114932 A1* | 4/2019 | Khatwa | .................. | G05D 1/042 |
| 2019/0227569 A1* | 7/2019 | Weslosky | ............. | G07C 5/0808 |
| 2019/0265731 A1* | 8/2019 | Mathan | .................. | B64D 43/00 |
| 2019/0278246 A1* | 9/2019 | Gopisetti | ........... | G05B 19/0421 |
| 2019/0279447 A1* | 9/2019 | Ricci | ........................ | B60R 25/00 |
| 2019/0324430 A1* | 10/2019 | Herzog | .................. | G07C 5/006 |
| 2019/0367180 A1* | 12/2019 | Singhai | .............. | G05B 23/0227 |
| 2020/0082729 A1* | 3/2020 | Heiberg | ............... | G08G 5/0039 |
| 2020/0259708 A1* | 8/2020 | Rule | ........................ | G06F 9/5077 |
| 2020/0285207 A1* | 9/2020 | Lu | ............................ | B64C 19/00 |
| 2021/0132634 A1* | 5/2021 | Groden | ............... | G08G 5/0091 |

FOREIGN PATENT DOCUMENTS

| | | | | |
|---|---|---|---|---|
| EP | 3246780 A1 * | 11/2017 | ............. | B64D 43/02 |
| EP | 3270366 A1 * | 1/2018 | ........... | G05D 1/0055 |
| EP | 3457243 A1 | 3/2019 | | |
| WO | WO-2016155856 A1 * | 10/2016 | ............. | G05B 19/05 |
| WO | WO-2018113864 A2 * | 6/2018 | ......... | G05B 23/0294 |

OTHER PUBLICATIONS

S. Gunawardena et al., "Controller-pilot Communications Using a VDL Mode 2 Datalink for the NASA Runway Incursion Prevention System,".*

International Search Report and Written Opinion for International Application No. PCT/US2019/040284 dated Dec. 10, 2019.

* cited by examiner

SYSTEM CONTROL ARCHITECTURE MONITORING SYSTEM

RELATED APPLICATIONS

This application claims priority from U.S. Provisional Application Ser. No. 62/822,416, filed 22 Mar. 2019, which is incorporated herein in its entirety.

TECHNICAL FIELD

The present disclosure relates generally to control systems, and specifically to a system control architecture monitoring system.

BACKGROUND

As automation of control systems increases, control schemes become significantly more complicated. For example, in system architectures such as petrochemical refineries, smart factory operating systems, and vehicle controls, different independent control systems can provide individual inputs to a central automation controller. The central automation controller can thus provide an overall control scheme for controlling the system architecture. The central automation controller can thus be programmed to render decisions as to the manner in which operational components (e.g., valves, motors, servos, etc.) can be controlled based on the different independent control systems. For example, the different independent control systems can attempt to exhibit control of the operational components in contributory and/or conflicting ways based on different aspects of situational conditions associated with the system architecture.

SUMMARY

One example includes a system control architecture that includes local control systems to provide respective condition signals associated with situational awareness conditions of an associated system architecture. A central system controller receives the condition signals, generates a control scheme for control of operational aspects of the associated system architecture based on the condition signals, and generates control signals based on the control scheme. The control scheme defines contributions of each of the local control systems to a control authority of each of the operational aspects. Operational components provide mechanical control of each of the operational aspects of the associated system architecture in response to the respective control signals to implement the control scheme. A control authority interface system provides an indication to a user of the respective contributions of the control authority of each of the respective local control systems to the operational aspects of the associated system architecture.

Another example includes a method for controlling a system architecture. The method includes receiving a plurality of condition signals associated with situational awareness conditions of an associated system architecture from a respective plurality of local control systems. The method also includes generating a control scheme for control of operational aspects of the associated system architecture based on the plurality of condition signals. The control scheme defines contributions of each of the plurality of local control systems to a control authority of each of the operational aspects. The method also includes generating a plurality of control signals based on the control scheme and providing mechanical control of each of the operational aspects of the associated system architecture via a plurality of system operational components in response to the respective plurality of control signals to implement the control scheme. The method further includes providing a graphical indication to a user of the respective contributions of the control authority of each of the respective plurality of local control systems to the operational aspects of the associated system architecture.

Another example includes a system control architecture for an aircraft. The architecture includes a plurality of local control systems configured to provide a respective plurality of condition signals associated with situational awareness conditions of the aircraft. The architecture also includes an autopilot control system configured to receive the plurality of condition signals, to generate a control scheme for control of operational aspects of the aircraft based on the plurality of condition signals, and to generate a plurality of control signals based on the control scheme. The control scheme can define contributions of each of the plurality of local control systems to a control authority of each of the operational aspects. The architecture also includes a plurality of aviation control components configured to provide mechanical control of each of the operational aspects of the aircraft in response to the respective plurality of control signals to implement the control scheme. The architecture can further include a control authority interface system configured to provide an indication to a user of contributions of the control authority of each of the respective plurality of local control systems to the operational aspects of the aircraft, and to facilitate user inputs comprising at least one of a disengage command associated with each of the plurality of local control systems to allow the user to selectively disable each of the plurality of local control systems and a global disengage command to allow the user to disable all of the plurality of local control systems.

DETAILED DESCRIPTION

Figure 1:
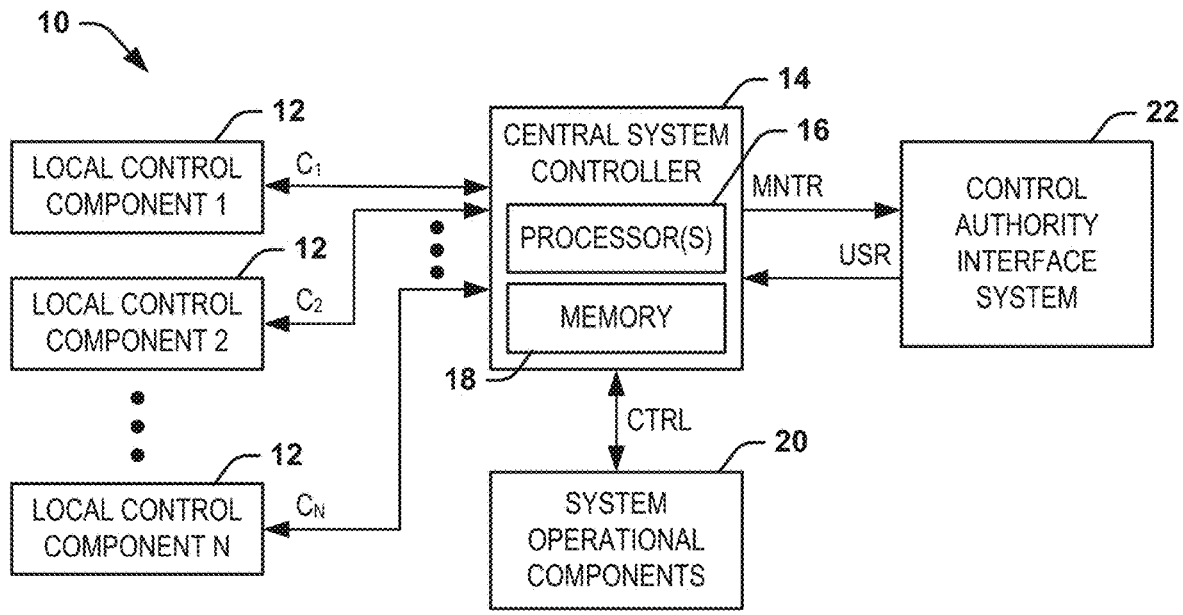
FIG. 1 illustrates an example of a system control architecture.

The present disclosure relates generally to control systems, and specifically to a system control architecture monitoring system. The system control architecture monitoring system can correspond to a control and monitoring system for any of a variety of large system architectures in a variety of different industries, such as petrochemical refineries, smart factory operating systems, and vehicle controls, such as for aircraft, spacecraft, and/or nautical craft. In a given system control architecture, a variety of different local control systems can provide control inputs to a central system controller. For example, the local control systems can each correspond to independent control systems having a defined specific control aspect that contributes to an overall operational aspect of the associated system architecture.

As an example, each of the local control systems can be configured as processing systems that can be individual computers/processors or a module of a larger computer or processing system that can receive inputs (e.g., from sensors and/or from the central system controller) associated with the specific control aspect and can generate outputs corresponding to the specific control aspect. For example, each of the local control systems can be configured to generate condition signals and/or commands that can be associated with sensor inputs associated with one or more situational awareness conditions of the system architecture. The central system controller can be configured to aggregate the condition signals and commands to generate an automated control scheme for the system architecture. The central system controller can thus provide control signals to system operational components to provide mechanical control of operational aspects of the system architecture based on the automated control scheme for the system architecture.

Based on the aggregation of the condition signals and commands, different local control systems can exhibit different amounts of control authority to the operational aspects of the system architecture. Therefore, the system control architecture can include a control authority interface system that is configured to provide an indication to a user of respective contributions of control authority associated with each of the respective plurality of local control systems as affecting operational aspects based on the control scheme. The control authority interface system can also facilitate user inputs to provide for diagnostic control of each of the plurality of local control systems. For example, the control authority interface system can allow the user to selectively disable one or more of the local control systems, such that the respective one or more of the local control systems can no longer contribute any control authority to the control scheme. The user inputs can also include thresholds that can be set for maximum control authority contributions of each of the local control systems, as well as alarms to provide indication to a user of a control authority or a mechanical control response approaching a predetermined limit or threshold. For example, the maximum control authority contributions can deviate from manufacturer default settings. As another example, the user inputs can also include alarm thresholds for situational awareness conditions, such as to provide alarms or warnings to the user in response to situational awareness conditions exceeding the thresholds that can be associated with potentially unsafe conditions.

FIG. 1 demonstrates a system control architecture 10. The system control architecture 10 can correspond to any of a variety of large and/or complex electromechanical systems. For example, the system control architecture 10 can correspond to an aircraft control system, as described herein. However, the system control architecture 10 can also be implemented for control and monitoring for any of a variety of large system architectures in a variety of different industries, such as petrochemical refineries, smart factory operating systems, or other types of vehicles (e.g., nautical craft or spacecraft).

The system control architecture 10 includes a plurality N of local control systems 12 and a central system controller 14. For example, the local control systems 12 can each correspond to independent control systems having a defined specific control aspect that contributes to an overall operational aspect of the associated system architecture. As an example, each of the local control systems 12 can be configured as independent processing systems that can be individual computers/processors or a module of a larger computer or processing system that can receive inputs (e.g., from sensors and/or from the central system controller 14) associated with the specific control aspect. For example, the inputs can correspond to one or more situational awareness conditions of the system architecture 10. In the example of FIG. 1, the local control systems 12 can each communicate with the central system controller 14 via a respective one of N condition signals, demonstrated as $C_1$ through $C_N$. The condition signals $C_1$ through $C_N$ can thus correspond to condition signals associated with situational awareness conditions of the system architecture 10, and can also correspond to command signals provided from the central system controller 14 to the respective local control systems 12.

The central system controller 14 can be configured to aggregate the condition signals $C_1$ through $C_N$ that are provided from the respective local control systems 12 to generate an automated control scheme for the system architecture 10. In the example of FIG. 1, the central system controller 14 includes one or more processors 16 that are configured to generate the control scheme in response to the condition signals $C_1$ through $C_N$. The processor(s) 16 can also receive instructions provided via one or more users as part of the data based on which the processor(s) 16 generate the control scheme. For example, the instructions can include route data for a flight path of an aircraft, such as entered by the pilot(s), flight controllers, and/or air traffic controllers. As an example, the control scheme can be stored in a memory 18, along with the data and instructions based on which the control scheme is generated.

The central system controller 14 can thus provide control signals CTRL to system operational components 20 that can provide mechanical control of operational aspects of the associated system architecture to implement the automated control scheme. For example, the system operational components 20 can include any of a variety of electromechanical components that implement control of the operational aspects of the associated system architecture, such as including motors, servos, solenoid valves, pumps, or any of a variety of other types of electromechanical components. As described herein, the term "operational aspects" describes the coordinated effects of one or more of the system operational components 20 to provide a desired mechanical or physical effect or result of the associated system architecture. Therefore, the central system controller 14 can be configured to receive all of the situational awareness information associated with the associated system architecture via the received condition signals $C_1$ through $C_N$, aggregate the information, generate the control scheme that can correspond to a reactionary response and/or a controlled response based on desired operational characteristics (such as input to the central system controller 14 via one or more users), and can generate the control signals CTRL to provide mechanical control of the operational aspects of the associated system architecture via the system operational components 20 to implement the control scheme.

As an example, and as described in greater detail herein, the associated system architecture can correspond to an aircraft. Therefore, the central system controller 14 can correspond to an autopilot control system and the system operational components 20 can correspond to aviation control components. Therefore, the local control systems 12 can correspond to autopilot subsystems, such as a yaw damper, an auto throttle, a pitch controller, an anti-stall measure, a directional controller, and/or a variety of other autopilot features that can maintain autonomous control of the aircraft. Accordingly, in response to receiving condition signals (e.g., the condition signals $C_1$ through $C_N$) from each of the autopilot subsystems, the autopilot control system can generate a control scheme for controlling the operational aspects (e.g., yaw, pitch, roll, and velocity) of the aircraft via the aviation control components (e.g., servos for controlling the wings and flaps, throttle for controlling the engines, etc.).

Referring to FIG. 1 generally, because the associated system architecture can correspond to a large and/or complex system architecture, the situational awareness information and the command signals provided between the local control systems 12 and the central system controller 14 can overlap in functionality. Therefore, the local control systems 12 can each exert separate respective contributions to an overall control authority for a given one of the operational aspects of the system architecture via the system operational components 20. However, because the local control systems 12 can operate independently of each other, the goals and/or reactions to situational awareness conditions can be conflicting with respect to each other, such that the contributions to the control authority for a given one or more of the operational aspects can be in conflict, and can sometimes present suboptimal or even dangerous conditions for the associated system architecture.

The system control architecture 10 therefore includes a control authority interface system 22 that is configured to provide an indication to a user of the respective contributions of control authority associated with each of the respective local control systems 12 to the operational aspects of the system architecture. As described in greater detail herein, the control authority interface system 22 can also facilitate user inputs to selectively disable the local control systems 12 and/or to provide for diagnostic control of each of the plurality of local control systems 12. In the example of FIG. 1, the control authority interface system 22 can receive control data MNTR from the central system controller 14 that can correspond to information regarding the operational parameters and the contributions of control authority associated with each of the local control components 12, such as based on the generated control scheme. Therefore, the control authority interface system 22 can provide the indication to the user of the respective contributions of control authority associated with each of the respective local control systems 12 to the operational aspects of the system architecture based on the control data MNTR.

For example, the control authority interface system 22 can include a graphical user interface (GUI) configured to provide a graphical indication of the respective control authority contributions of each of the local control systems 12. As another example, the GUI can demonstrate situational awareness of the associated system architecture, such as pertaining to graphical demonstrations of the associated operational aspects and the control authority contributions to the operational aspects. As another example, the GUI can facilitate user inputs to set limits and/or alarms associated with the control authority and/or the associated operational aspects, demonstrated in the example of FIG. 1 as a signal USR. As a result, the user(s) of the control authority interface system 22 can provide selective control of the local control systems 12, such as pertaining to the operational aspects of the system architecture, to provide for a greater degree of control and/or safety of the operation of the system architecture.

Figure 2:
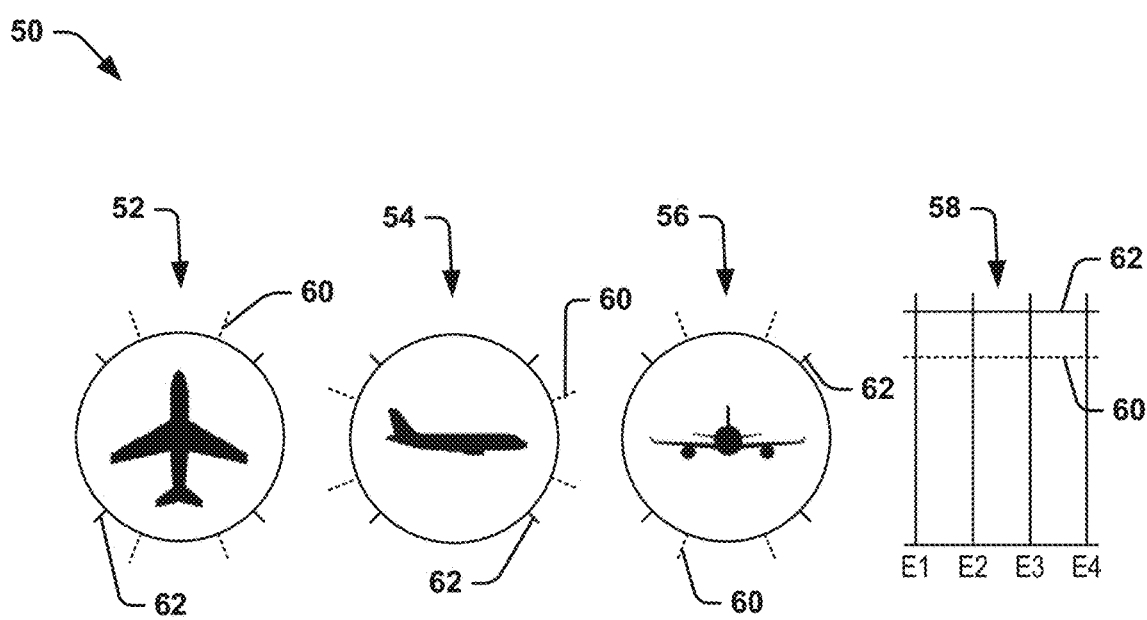
FIG. 2 illustrates an example of diagram of aircraft operational parameters.

As described previously, the associated system architecture can correspond to an aircraft. FIG. 2 illustrates an example of diagram 50 of aircraft operational parameters. The diagram 50 demonstrates the operational parameters, generally, as yaw 52, pitch 54, roll 56, and engine thrust 58. The operational parameters 52, 54, 56, and 58 can be controlled in response to the control signal CTRL provided to the system operational components 20, which can include wing flaps, tail flaps, engine controls, and/or a variety of other aviation control components configured to provide control of the operational parameters 52, 54, 56, and 58. In the example of FIG. 2, each of the operational parameters 52, 54, 56, and 58 includes limits 60, demonstrated as dotted lines, and limits 62, demonstrated as solid lines. The limits 60 can correspond to limits that are associated with limits of manual control, such that exceeding the limit can correspond to an inability of a pilot to manually control the aircraft upon exceeding the respective limit 60. The limits 62 can correspond to limits associated with autopilot features, such that the aircraft is permitted to achieve the respective limits 62 based on the autopilot features. For example, the autopilot system corresponding to the central control system 14 can permit the aircraft to operate between the limits 60 and 62 based on the control signals CTRL to the aviation control components (e.g., corresponding to the system operational components 20). As described in greater detail herein, the pilot(s) can program the limits 62 via the control authority interface system 22.

Figure 3:
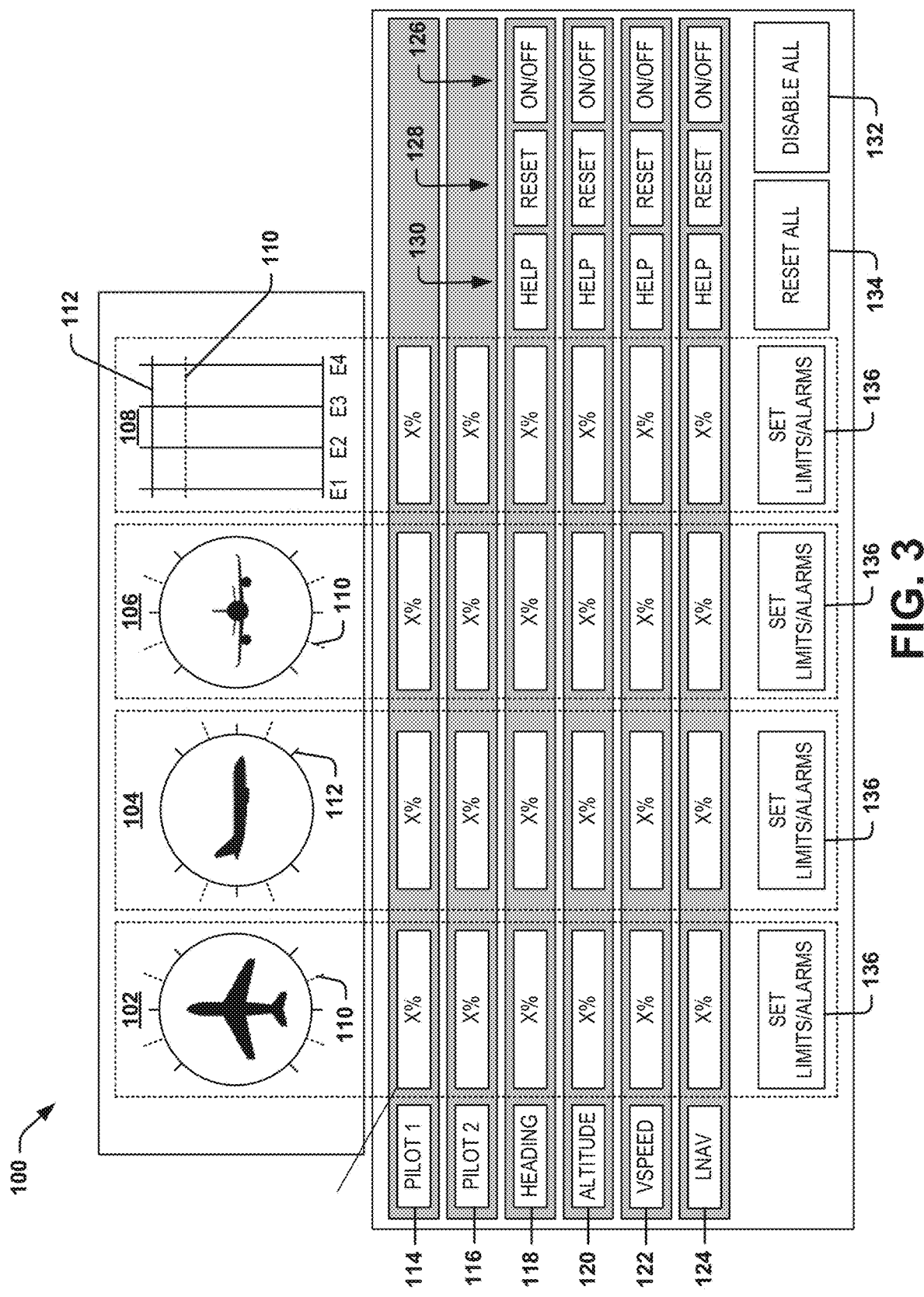
FIG. 3 illustrates an example of a graphical user interface (GUI) associated with a control authority interface system.

FIG. 3 demonstrates a GUI 100 associated with a control authority interface system for an aircraft. The GUI 100 can provide visual indication to a pilot of the situational awareness of the flight of the respective aircraft. The control authority interface system can correspond to the control authority interface system 22 in the example of FIG. 1 for controlling an aircraft, such as based on the operational parameters 52, 54, 56, and 58 in the example of FIG. 2. Therefore, reference is to be made to the examples of FIGS. 1 and 2 in the following description of the example of FIG. 3.

The GUI 100 demonstrates a visual indication of the operational parameters demonstrated as yaw 102, pitch 104, roll 106, and engine thrust 108. The operational parameters yaw 102, pitch 104, roll 106, and engine thrust 108 can be controlled in response to the control signal CTRL provided to the system operational components 20, which can include wing flaps, tail flaps, engine controls, and/or a variety of other aviation control components configured to provide control of the operational parameters yaw 102, pitch 104, roll 106, and engine thrust 108, similar to as described previously in the example of FIG. 2. Similar to as also described previously in the example of FIG. 2, each of the operational parameters 102, 104, 106, and 108 includes limits 110, demonstrated as dotted lines, and limits 112, demonstrated as solid lines. The limits 110 can correspond to limits that are associated with limits of manual control, such that exceeding the limit can correspond to an inability of a pilot to manually control the aircraft upon exceeding the respective limit 110. The limits 112 can correspond to limits associated with autopilot features, such that the aircraft is permitted to achieve the respective limits 112 based on the autopilot features. Therefore, the pilot(s) of the aircraft can visually determine the status of the each of the operational parameters 102, 104, 106, and 108, such as relative to the limits 110 and 112.

In the example of FIG. 3, the operational parameters 102, 104, 106, and 108 are demonstrated as columns. The GUI 100 includes a plurality of different local control systems that are demonstrated as rows to form an array to provide user control of the local control systems with respect to the operational parameters 102, 104, 106, and 108. In the example of FIG. 3, the local control systems include a first pilot ("PILOT 1") 114 corresponding to the manual controls of one of the pilots, and a second pilot ("PILOT 2") 116 corresponding to the manual controls of a second one of the pilots. The local control systems also include a flight director heading ("HEADING") 118, a flight director altitude ("ALTITUDE") 120, a flight director velocity ("VSPEED") 122, and a flight director lateral navigation ("LNAV") 124. It is to be understood that the list of local control systems 114, 116, 118, 120, 122, and 124 is not intended to be exhaustive, and can include additional local control systems that can be implemented for autopilot control features of the aircraft.

At an intersection of each of the local control systems 114, 116, 118, 120, 122, and 124 and each of the operational parameters 102, 104, 106, and 108, the GUI 100 demonstrates an indication of a contribution of control authority (e.g., in percentage) of each of the local control systems 114, 116, 118, 120, 122, and 124 to each of the operational parameters 102, 104, 106, and 108. As a result, the pilot(s) can determine which of the local control systems 114, 116, 118, 120, 122, and 124 are contributing to the respective operational parameters 102, 104, 106, and 108. For example, in response to potentially unanticipated or unwanted changes in one or more of the operational parameters 102, 104, 106, and 108, the pilot(s) can quickly ascertain which of the local control systems 114, 116, 118, 120, 122, and 124 is contributing to the respective operational parameter(s) 102, 104, 106, and 108 and to what degree. For example, two or more of the local control systems 114, 116, 118, 120, 122, and 124 can be competing in disparate ways for control of a given one of the operational parameters 102, 104, 106, and 108, such as based on one or more faulty sensors, competing goals of the control scheme, or a variety of other factors. As a result, the respective contributions of the control authority of the respective two or more of the local control systems 114, 116, 118, 120, 122, and 124 can result in undesirable control of the respective operational parameters 102, 104, 106, and 108. Such undesirable control of the respective operational parameters 102, 104, 106, and 108 can provide for unwanted or dangerous results.

The GUI 100 can thus include a set of individual controls for one or more of the local control systems 114, 116, 118, 120, 122, and 124. In the example of FIG. 3, the individual controls include a selective disable button ("ON/OFF") 126, a reset button ("RESET") 128, and a diagnostic control button ("HELP") 130, such as for a subset of the local control systems 114, 116, 118, 120, 122, and 124. The subset is demonstrated as being provided for the local control systems 118, 120, 122, and 124, and not for the pilots 114 and 116 (e.g., to always allow activation of the pilot controls for the pilots). However, it is to be understood that some individual controls can be provided for pilot controls, or can be provided for all local control systems in non-aviation environments.

The selective disable button 126 is configured to completely deactivate the respective one of the local control systems 114, 116, 118, 120, 122, and 124, or to reactivate the respective one of the local control systems 114, 116, 118, 120, 122, and 124 in response to a previous deactivation. For example, the pilot(s) can determine that a given one of the local control systems 114, 116, 118, 120, 122, and 124 can be undesirably contributing to the control authority of one of the operational parameters 102, 104, 106, and 108, such as based on a malfunction or an unexpected circumstance. Therefore, in response to determining an undesirable contribution to the control authority, the pilot(s) can decide that it would be beneficial for a safety reason or operational efficiency reason to selectively deactivate the offending one of the local control systems 114, 116, 118, 120, 122, and 124. As a result, one or more of the other local control systems 114, 116, 118, 120, 122, and 124 can increase the respective contributions of the control authority to the respective one of the operational parameters 102, 104, 106, and 108 for a more desirable control of the respective one of the operational parameters 102, 104, 106, and 108. Additionally, the GUI 100 also includes a global disable button ("DISABLE ALL") 132 to disable all of the subset of the operational parameters 102, 104, 106, and 108 (e.g., the local control systems 118, 120, 122, and 124 in the example of FIG. 3) to allow for sole manual control of the aircraft by the pilot controls 114 and 116.

The selective reset button 128 is configured to provide a reset or "reboot" of the respective one of the local control systems 114, 116, 118, 120, 122, and 124. For example, the pilot(s) can be attempting to diagnose a potential problem or behavior of one of the local control systems 114, 116, 118, 120, 122, and 124, such that a reset of the respective one of the local control systems 114, 116, 118, 120, 122, and 124 can determinative of whether the local control systems 114, 116, 118, 120, 122, and 124 will resume a similar behavior upon being reset. As another example, the pilot(s) can make an adjustment to one of the local control systems 114, 116, 118, 120, 122, and 124, such that a reset of the respective one of the local control systems 114, 116, 118, 120, 122, and 124 can be indicative of whether the adjustment will result in a desired behavior of the respective one of the local control systems 114, 116, 118, 120, 122, and 124. As yet another example, the pilot(s) can reset a given one of the local control systems 114, 116, 118, 120, 122, and 124 to return to a default condition, such as after adjustments to the respective one of the local control systems 114, 116, 118, 120, 122, and 124 (e.g., based on manually setting maximum limits of a contribution to the control authority of the local control systems 114, 116, 118, 120, 122, and 124 for a given one of the operational parameters 102, 104, 106, and 108, as described in greater detail herein). Additionally, the GUI 100 also includes a global reset button ("RESET ALL") 134 to reset all of the subset of the operational parameters 102, 104, 106, and 108 (e.g., the local control systems 118, 120, 122, and 124 in the example of FIG. 3) to allow for a full reboot of the autopilot system of the aircraft.

The selective diagnostic control button 130 is configured to provide a manner for the pilot(s) to implement diagnostic control or manual diagnostics of a given one of the local control systems 114, 116, 118, 120, 122, and 124. For example, the diagnostic control button 130 can be pressed by a pilot to access instructions or flight manual information as to how to operate, troubleshoot, or otherwise manipulate a given one of the local control systems 114, 116, 118, 120, 122, and 124. As an example, in response to determining a malfunction of a given one of the local control systems 114, 116, 118, 120, 122, and 124, the pilot(s) can selectively disable the respective one of the local control systems 114, 116, 118, 120, 122, and 124 to deactivate the contribution of the respective one of the local control systems 114, 116, 118, 120, 122, and 124 to the corresponding one or more operational parameters 102, 104, 106, and 108. However, the pilot(s) may not know the reason for the malfunction, and may want to be able to troubleshoot the problem. Therefore, the pilot(s) can engage the diagnostic control button 130 to access instructions (e.g., a pop-up window or screen change) as to how to troubleshoot or even correct the malfunction. For example, the instructions can include circuit schematic information, fuse or circuit breaker information, a troubleshooting checklist, diagnostic information, or any of a variety of other sets of information as to how to troubleshoot, repair, or otherwise access the appropriate information pertaining to the respective one of the local control systems 114, 116, 118, 120, 122, and 124.

The GUI 100 also includes limit/alarm buttons 136 that allow the pilot(s) to provide control over the contributions to the control authority and/or over the operational parameters 102, 104, 106, and 108. For example, the pilot(s) can interact with the buttons 136 to set a minimum or a maximum limit of the contribution of a given one or more of the local control systems 114, 116, 118, 120, 122, and 124 to the control authority for a given one or more of the operational parameters 102, 104, 106, and 108. As an example, the pilot(s) can determine that it is better to provide a limit to the control authority of one of the local control systems 114, 116, 118, 120, 122, and 124 to provide for a greater control authority of another one of the local control systems 114, 116, 118, 120, 122, and 124 to achieve a particular goal (e.g., sacrificing comfort for fuel efficiency, or vice versa). Therefore, the pilot(s) can tailor the minimum and/or maximum values of control authority of each of the local control systems 114, 116, 118, 120, 122, and 124, such as from nominal or default values, to suit personal preferences for flying the aircraft. As another example, the pilot(s) can also implement the limit/alarm buttons 136 to set the limits 112 of the operational parameters 102, 104, 106, and 108. As described previously, the limits associated with the local control systems 114, 116, 118, 120, 122, and 124 or the operational parameters 102, 104, 106, and 108 can be reset in response to the reset buttons 128 or the global reset button 134.

Additionally, the limit/alarm buttons 136 can also allow the pilot(s) to set alarm conditions associated with each of the local control systems 114, 116, 118, 120, 122, and 124 or the operational parameters 102, 104, 106, and 108 of the aircraft. For example, the alarm conditions can provide a visual and/or audial alarm to the pilot(s) in response to a given one of the local control systems 114, 116, 118, 120, 122, and 124 or the operational parameters 102, 104, 106, and 108 exceeding a programmable threshold to provide notice to the pilot(s) that action or manual control of the aircraft or part of the aircraft may be required. As another example, the alarms can be set as a function of the limits that are set by the limit/alarm buttons 136. Therefore, in response to a given one of the local control systems 114, 116, 118, 120, 122, and 124 approaching a setpoint limit associated with the control authority, the GUI 100 can implement an alarm. Similarly, the GUI 100 can indicate an alarm in response to a given one of the operational parameters 102, 104, 106, and 108 approaching the limit 110, and/or being between the limits 110 and 112. Accordingly, the pilot(s) can be given more situational awareness of the autopilot features of the aircraft in mid-flight.

Figure 4:
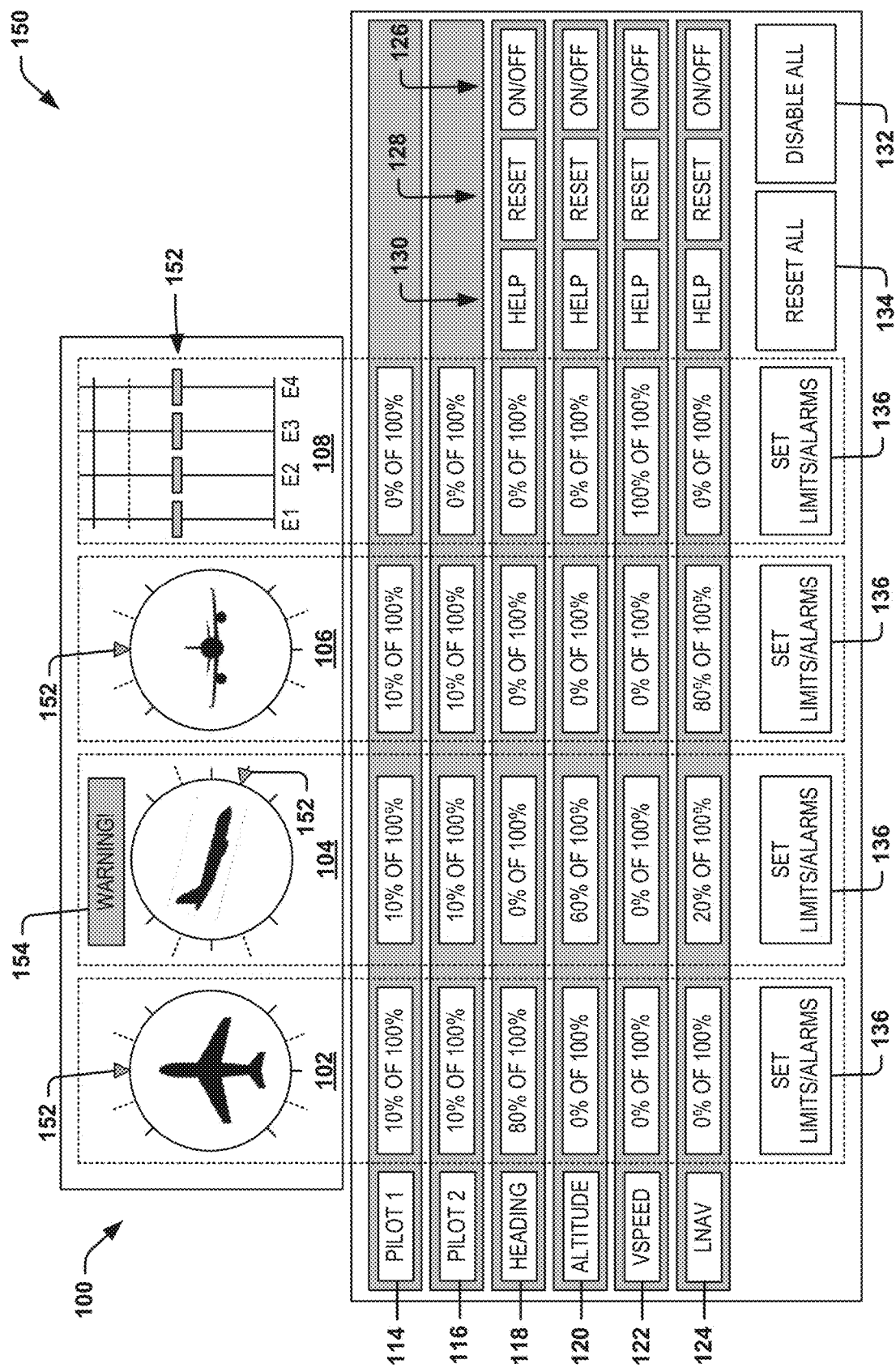
FIG. 4 illustrates another example diagram of the GUI associated with a control authority interface system.

FIG. 4 demonstrates an example diagram 150 of the GUI 100 associated with a control authority interface system for the aircraft. The diagram 150 corresponds to an example state of the GUI 100, and thus demonstrates like reference numbers as provided in the example of FIG. 3. Therefore, reference is to be made to the examples of FIGS. 1 through 3 in the following description of the example of FIG. 4.

In the example of FIG. 4, each of the operational parameters demonstrated as yaw 102, pitch 104, roll 106, and engine thrust 108 include a current state indicator 152 that demonstrates a current situational awareness status of each of the respective operational parameters 102, 104, 106, and 108. Each of the operational parameters 102, 104, 106, and 108 is demonstrated as having separate contributions of the control authority provided from a subset of the local control systems 114, 116, 118, 120, 122, and 124. For example, the diagram 150 demonstrates that 10% of the control authority to the yaw 102 is provided from each of the pilot controls 114 and 116 separately, and that the other 80% of the control authority to the yaw 102 is provided from the flight director heading 118. Similarly, the diagram 150 demonstrates that 10% of the control authority to the pitch 104 is provided from each of the pilot controls 114 and 116 separately, 60% of the control authority to the pitch 104 is provided from the flight director altitude 120, and that the other 20% of the control authority to the pitch 104 is provided from the flight director lateral navigation 124. Similarly, the diagram 150 demonstrates that 10% of the control authority to the roll 106 is provided from each of the pilot controls 114 and 116 separately, and that the other 80% of the control authority to the roll 106 is provided from the flight director lateral navigation 124. Also similarly, the diagram 150 demonstrates that 100% of the control authority to the engine thrust 108 is provided from the flight director velocity 122.

As an example, the contributions to the control authority of each of the local control systems 114, 116, 118, 120, 122, and 124 to the operational parameters 102, 104, 106, and 108 can be based on normal operation of the local control systems 114, 116, 118, 120, 122, and 124. Additionally or alternatively, the contributions to the control authority can be provided based on limits, minimum and/or maximum, as set by the pilot(s) via the limit/alarm buttons 136. Therefore, the pilot(s) can monitor the contributions to the control authority of each of the local control systems 114, 116, 118, 120, 122, and 124 to the operational parameters 102, 104, 106, and 108 based on the graphical and numeric indications on the GUI 100.

In the example of FIG. 4, the current state indicator 152 of the pitch 104 demonstrates that the aircraft is nosing down and has reached the limit 110 associated with the manual control limit of operation of the pitch 104. In response, the central system controller 14 can be configured to provide an indicator (e.g., via the signal MNTR) for an alarm, demonstrated at 154, which can include both visual and audible components. The alarm 154 can thus provide a warning to the pilot(s) that the limit 110 was reached, and is therefore indicative of a potentially unsafe condition. As a result, the pilot(s) may be prompted to take action, such as to disable the flight director altitude 120 via the respective selective disable button 126 for the flight director altitude 120. As an example, disabling the flight director altitude 120 can allow for a greater contribution of the control authority to the flight director lateral navigation 124 and/or the pilot controls 114 and 116. The pilot(s) can then, for example, access the appropriate troubleshooting and/or repair instructions via the diagnostic control button 130. Additionally or alternatively, the pilot(s) can reset the flight director altitude 120 via the selective reset button 128 to reboot the flight director altitude 120 to determine if the reboot will fix the potential problem, or diagnose if the flight director altitude 120 is causing the potential problem. Additionally or alternatively, the pilot(s) can engage the global disable button 132 or the global reset button 134 to affect all of the local control systems 114, 116, 118, 120, 122, and 124, such as to provide for complete manual control or a system-wide reboot.

The GUI 100 of the control authority interface system can therefore provide the pilot(s) with greater visibility and the ability to exhibit greater control with respect to the control scheme generated by the central system controller (e.g., autopilot system). As a result, the pilot(s) can be able to more rapidly determine the source of undesirable aspects of the control scheme, such as resulting from malfunctioning local control systems or from disparate goals of the control scheme, and can react to avoid harmful results. Such a feature of the control authority interface system can therefore substantially mitigate dangerous situations that currently occur with other typical central system controllers of system control architectures, such as having resulted in fatal crashes. While the example described herein is with respect to an autopilot controller of an aircraft, it is to be understood that the examples described herein can apply to other types of large and/or complex system architectures, such as factory settings, petroleum or gas plants, or any of a variety of other types of systems that require mechanical control from many different independent information sources.

Figure 5:
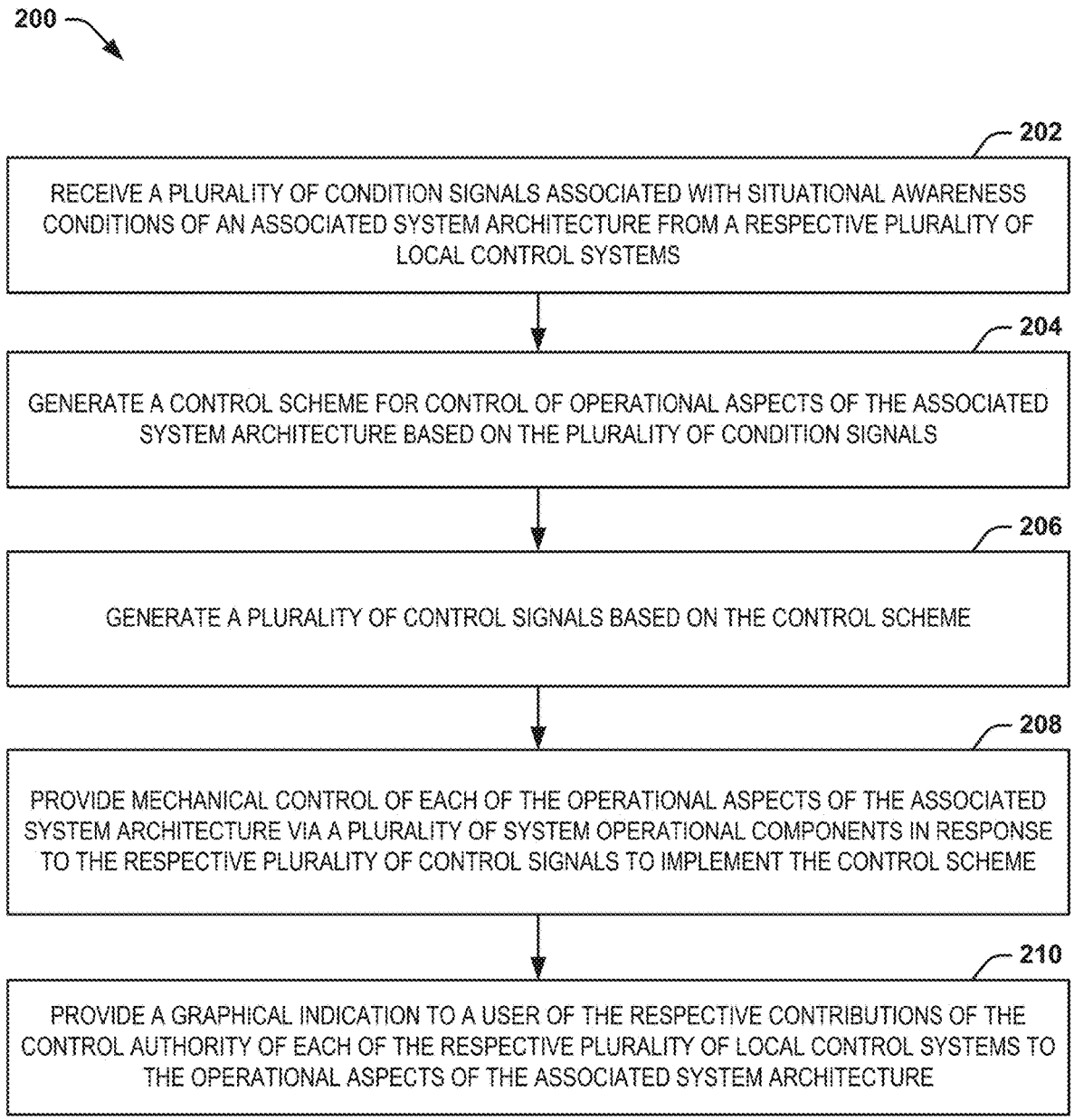
FIG. 5 illustrates an example of a method for controlling a system architecture.

In view of the foregoing structural and functional features described above, a methodology in accordance with various aspects of the example embodiments will be better appreciated with reference to FIG. 5. While, for purposes of simplicity of explanation, the methodologies of FIG. 5 are shown and described as executing serially, it is to be understood and appreciated that the example embodiments are not limited by the illustrated order, as some aspects could, in accordance with the example embodiments, occur in different orders and/or concurrently with other aspects from that shown and described herein. Moreover, not all illustrated features may be required to implement a methodology in accordance with an aspect of the example embodiments.

FIG. 5 illustrates an example of a method 200 for controlling a system architecture (e.g., an aircraft). At 202, a plurality of condition signals (e.g., $C_1$ through $C_N$) associated with situational awareness conditions of the associated system architecture are received from a respective plurality of local control systems (e.g., the local control systems 12). At 204, a control scheme for control of operational aspects (e.g., the operational parameters 102, 104, 106, and 108) of the associated system architecture is generated based on the plurality of condition signals. The control scheme can define contributions of each of the plurality of local control systems to a control authority of each of the operational aspects. At 206, a plurality of control signals (e.g., the control signals CTRL) are generated based on the control scheme. At 208, mechanical control of each of the operational aspects of the associated system architecture is provided via a plurality of system operational components (e.g., the system operational components 20) in response to the respective plurality of control signals to implement the control scheme. At 210, a graphical indication is provided (e.g., via the GUI 100) to a user of the respective contributions of the control authority of each of the respective plurality of local control systems to the operational aspects of the associated system architecture.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system control architecture comprising:
   a plurality of local control systems configured to provide a respective plurality of condition signals associated with situational awareness conditions of an associated system architecture;
   a central system controller configured to receive the plurality of condition signals, to generate a control scheme for control of operational aspects of the associated system architecture based on the plurality of condition signals, the control scheme defining contributions of each of the plurality of local control systems to a control authority of each of the operational aspects, and to generate a plurality of control signals based on the control scheme;
   a plurality of system operational components configured to provide mechanical control of each of the operational aspects of the associated system architecture in response to the respective plurality of control signals to implement the control scheme; and
   a control authority interface system configured to provide an indication to a user of the respective contributions of the control authority of each of the respective plurality of local control systems to the operational aspects of the associated system architecture.

2. The architecture of claim 1, wherein the control authority interface system is further configured to facilitate user inputs to display instructions for diagnostic control of each of the plurality of local control systems.

3. The architecture of claim 1, wherein the control authority interface system is further configured to facilitate user inputs comprising at least one of a reset command associated with each of the plurality of local control systems to allow the user to selectively reboot each of the plurality of local control systems, and a global disengage command to allow the user to reboot all of the plurality of local control systems.

4. The architecture of claim 1, wherein the control authority interface system is further configured to facilitate user inputs comprising at least one of a disengage command associated with each of the plurality of local control systems to allow the user to selectively disable each of the plurality of local control systems, and a global disengage command to allow the user to disable all of the plurality of local control systems.

5. The architecture of claim 1, wherein the control authority interface system is further configured to provide a graphical indication of at least one of the operational aspects and the contributions of the control authority associated with each of the respective plurality of local control systems.

6. The architecture of claim 1, wherein the control authority interface system is further configured to provide an indication of at least one of the operational aspects and the contributions of the control authority associated with each of the at least one of the respective plurality of local control systems relative to respective limits associated with at least one of values and rates of the respective at least one of the operational aspects and the contributions of the control authority associated with each of the respective plurality of local control systems.

7. The architecture of claim 6, wherein the limits comprise a first limit associated with a manual control capability limit of the respective at least one of the operational aspects and the contributions of the control authority of a respective one of the plurality of system operational components and a second limit associated with a manufactured safety limit of the respective at least one of the operational aspects and the contributions of the control authority of the respective one of the plurality of system operational components.

8. The architecture of claim 6, wherein the control authority interface system is further configured to provide at least one of a visual and an audible warning to the user in response to the respective at least one of the operational aspects and the contributions of the control authority associated with at least one of the respective plurality of local control systems having a value with a predetermined threshold of a respective limit.

9. The architecture of claim 6, wherein the control authority interface system is configured to facilitate user inputs comprising setpoint values for the respective limits associated with the respective contributions of the control authority of each of the respective plurality of local control systems.

10. The architecture of claim 1, wherein the system architecture is an aircraft, wherein the central system controller comprises an autopilot control system for the aircraft, and wherein the plurality of system operational components correspond to aviation control components.

11. A method for controlling a system architecture, the method comprising:
receiving a plurality of condition signals associated with situational awareness conditions of an associated system architecture from a respective plurality of local control systems;
generating a control scheme for control of operational aspects of the associated system architecture based on the plurality of condition signals, the control scheme defining contributions of each of the plurality of local control systems to a control authority of each of the operational aspects;
generating a plurality of control signals based on the control scheme;
providing mechanical control of each of the operational aspects of the associated system architecture via a plurality of system operational components in response to the respective plurality of control signals to implement the control scheme; and
providing a graphical indication to a user of the respective contributions of the control authority of each of the respective plurality of local control systems to the operational aspects of the associated system architecture.

12. The method of claim 11, further comprising receiving user inputs to display instructions for diagnostic control of each of the plurality of local control systems.

13. The method of claim 11, further comprising receiving user inputs to at least one of selectively disable each of the plurality of local control systems and to disable all of the plurality of local control systems.

14. The method of claim 11, wherein providing the graphical indication comprises providing an indication of at least one of the operational aspects and the contributions of the control authority associated with each of the at least one of the respective plurality of local control systems relative to respective limits associated with at least one of values and rates of the respective at least one of the operational aspects and the contributions of the control authority associated with each of the respective plurality of local control systems.

15. The method of claim 14, further comprising receiving user inputs to set values for the respective limits associated with the respective contributions of the control authority of each of the respective plurality of local control systems.

16. A system control architecture for an aircraft comprising:
a plurality of local control systems configured to provide a respective plurality of condition signals associated with situational awareness conditions of the aircraft;
an autopilot control system configured to receive the plurality of condition signals, to generate a control scheme for control of operational aspects of the aircraft based on the plurality of condition signals, the control scheme defining contributions of each of the plurality of local control systems to a control authority of each of the operational aspects, and to generate a plurality of control signals based on the control scheme;
a plurality of aviation control components configured to provide mechanical control of each of the operational aspects of the aircraft in response to the respective plurality of control signals to implement the control scheme; and
a control authority interface system configured to provide an indication to a user of contributions of the control authority of each of the respective plurality of local control systems to the operational aspects of the aircraft, and to facilitate user inputs comprising at least one of a disengage command associated with each of the plurality of local control systems to allow the user to selectively disable each of the plurality of local control systems and a global disengage command to allow the user to disable all of the plurality of local control systems.

17. The architecture of claim 16, wherein the control authority interface system is further configured to facilitate user inputs to display instructions for diagnostic control of each of the plurality of local control systems.

18. The architecture of claim 16, wherein the control authority interface system is further configured to provide a graphical indication of at least one of the operational aspects and the contributions of the control authority associated with each of the respective plurality of local control systems.

19. The architecture of claim 16, wherein the control authority interface system is further configured to provide an indication of at least one of the operational aspects and the contributions of the control authority associated with each of the at least one of the respective plurality of local control systems relative to respective limits associated with at least one of values and rates of the respective at least one of the operational aspects and the contributions of the control authority associated with each of the respective plurality of local control systems.

20. The architecture of claim 19, wherein the control authority interface system is further configured to facilitate user inputs comprising setpoint values for the respective limits associated with the respective contributions of the control authority of each of the respective plurality of local control systems.

* * * * *